Feb. 11, 1969   B. G. SHEPHERD   3,426,466
CLAMP FOR SECURING A FISHING ROD AND REEL TO A HANDLE
Filed April 26, 1967
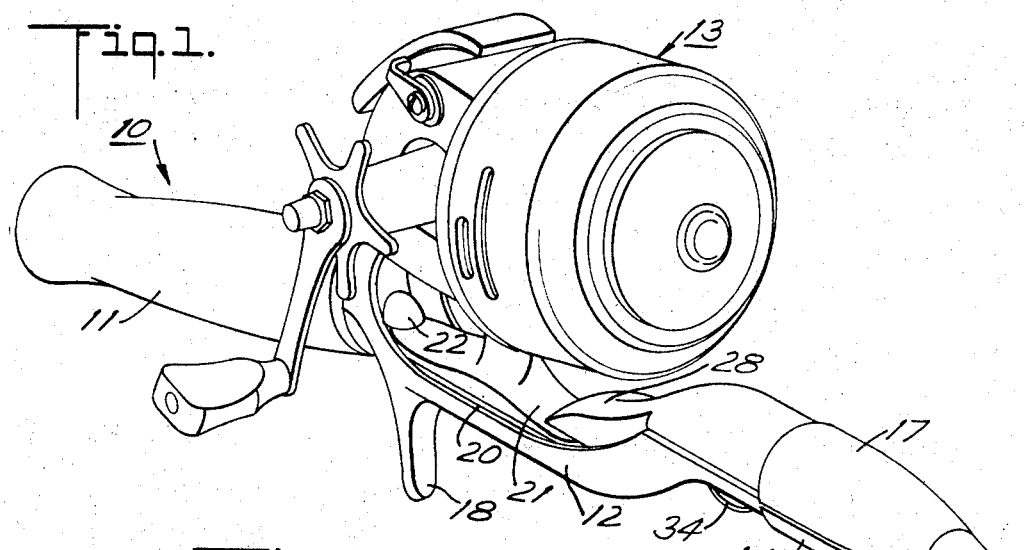
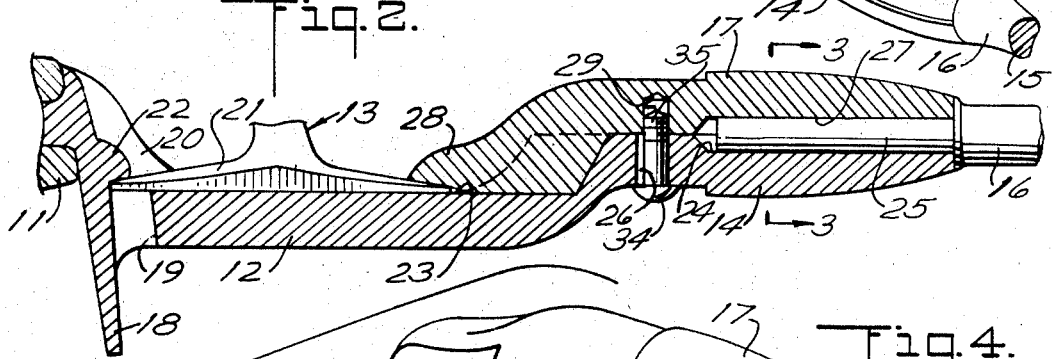
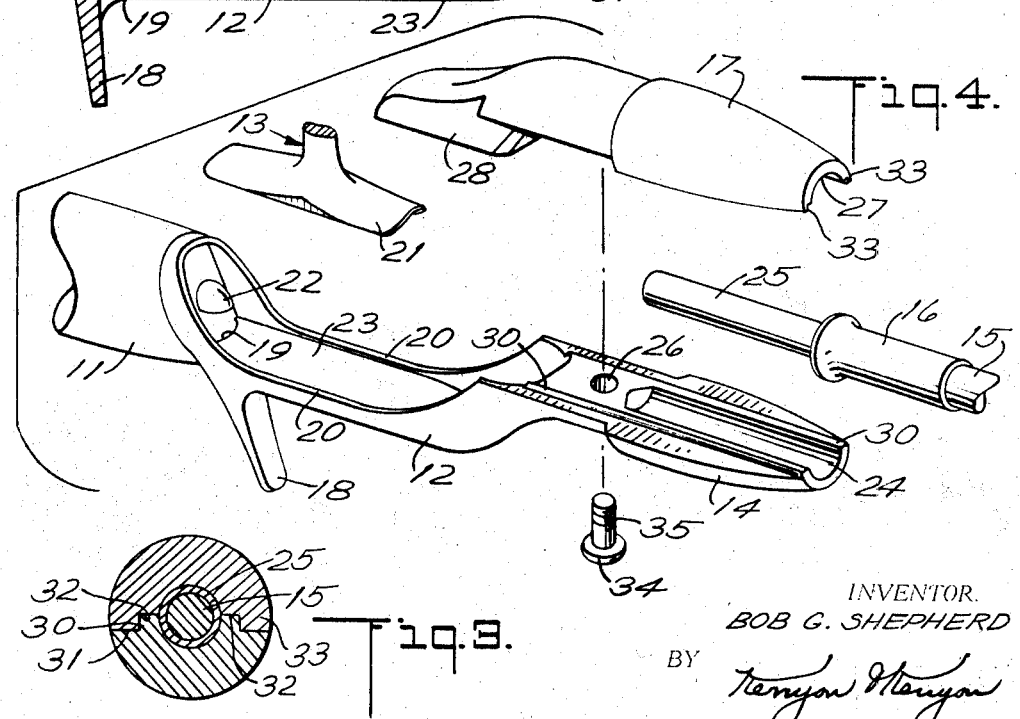
INVENTOR.
BOB G. SHEPHERD
BY
ATTORNEYS

INVENTOR.
BOB G. SHEPHERD
BY
ATTORNEYS

United States Patent Office 3,426,466
Patented Feb. 11, 1969

3,426,466
CLAMP FOR SECURING A FISHING ROD AND REEL TO A HANDLE
Bob G. Shepherd, West Columbia, S.C., assignor to Columbia Products Company, Columbia, S.C., a corporation of South Carolina
Filed Apr. 26, 1967, Ser. No. 633,842
U.S. Cl. 43—22
Int. Cl. A01k 87/06
12 Claims

ABSTRACT OF THE DISCLOSURE

A one-piece clamp having a flange overlying one end of a base plate for a fishing reel which is in a recessed portion of a handle, and a main body portion overlying a fishing rod which is in a grooved portion of the handle. A single threaded fastener passes through the handle and threadably engages the clamp between the flange and the main body portion of the clamp so that, upon tightening, the base plate of the reel and the fishing rod are both clamped between the clamp and handle by means of the same fastener.

This invention relates to a clamp for securing a fishing rod and reel to a handle. More particularly, this invention relates to a clamp for simultaneously securing both a fishing rod and reel to a handle.

Heretofore, fishing rods such as casting rods have had handles constructed with a recessed portion for receiving the base plate of a fishing reel and a forward tubular portion for receiving the fishing rod. The recessed portion of such handles have been provided with a ledge at one end and an adjustable clamping plate at the other end to clamp a reel therein, and the tubular portion has cooperated with a ferrule to secure a fishing rod. The ferrule has in some instances been threaded onto the tube portion and in other instances has been press-fitted onto the tubular portion in order to clamp the fishing rod within the tubular portion.

In order to avoid the use of two clamps; that is, one for the fishing rod and another for the fishing reel, the handles have been provided with split forward tube portions and with sleeves which not only slip over the split portions to secure a fishing rod therein, but which also slide over one end of a base plate of a reel to cooperate with a ledge over the other end of the base plate to secure the reel in place. However, in such cases, the sleeves have not been able to effectively clamp reels having varying sized base plates and rods having varying diameters. That is, where the base plates are shorter or thinner than average, after clamping a rod in place the sleeves have often not been capable of being moved any farther to satisfactorily and reliably clamp the base plates. Conversely, where the base plates of the reels are longer or thicker than average, after clamping a reel in place the sleeves have often not been capable of being moved any farther to clamp the rod securely in place.

It is an object of this invention to provide a clamp which simultaneously clamps both a fishing rod and a fishing reel to a handle.

It is another object of the invention to provide a clamp which allows rapid mounting of a fishing rod and reel to a handle.

It is another object of the invention to provide a handle and clamp which are adjustable to different sized rods and reel base plates.

It is another object of the invention to secure a fishing rod and reel to a handle with a single clamping movement.

Briefly, this invention provides a clamp which is adjustably fitted onto a handle to clamp both a fishing rod and reel in place. The clamp cooperates with a handle of the offset handle type or straight handle type which has a first portion for receiving the base plate of a reel and a second or extended forward portion for receiving a fishing rod. The reel receiving portion of the handle includes a ledge which is sized to overlie one end of the fishing reel base plate, and the rod receiving portion is longitudinally grooved to receive the fishing rod and is provided with a transverse aperture between the groove and the reel receiving portion of the handle. The clamp is formed with a main body portion and a depending rear portion. The main body portion of the clamp has a groove which is complementary to the groove in the forward portion of the handle, and the rear portion of the clamp overlies the reel receiving portion of the handle to overlie the other end of the base plate. A threaded fastener of slightly smaller diameter than the aperture in the handle passes freely through the aperture to threadably engage a threaded bore in the clamp so as to draw the clamp against the handle.

When a fishing reel and rod are to be mounted, the clamp may be initially removed from the handle. Thereafter, the reel base plate is set in place under the ledge in the handle and the fishing rod is set in place in the groove in the forward handle portion. Next, the clamp is positioned over the rod, base plate and handle. Then, the threaded screw is passed through the handle and threaded into the clamp until the rod and reel are securely clamped between the clamp and handle.

The position of the threaded screw in the clamp between the rod mounting groove and depending flange and the size of the screw relative to the aperture in the handle are such as to allow the clamp to adjustably secure reel base plates of different lengths and thicknesses as well as rods of different diameters to the same handle.

These and other objects and advantages of the invention will become more apparent from the following detailed description and appended claims taken in conjunction with the accompanying drawings in which:

FIG. 1 illustrates a perspective view of a handle embodying a clamp of the invention with a reel and a rod clamped in place;

FIG. 2 illustrates a partial longitudinal cross-sectional view of the handle and clamp of FIG. 1 with the base plate of a reel and the base of the rod in clamped position;

FIG. 3 illustrates a view taken on line 3—3 of FIG. 2;

FIG. 4 illustrates an exploded view of FIG. 1;

Figure 5:
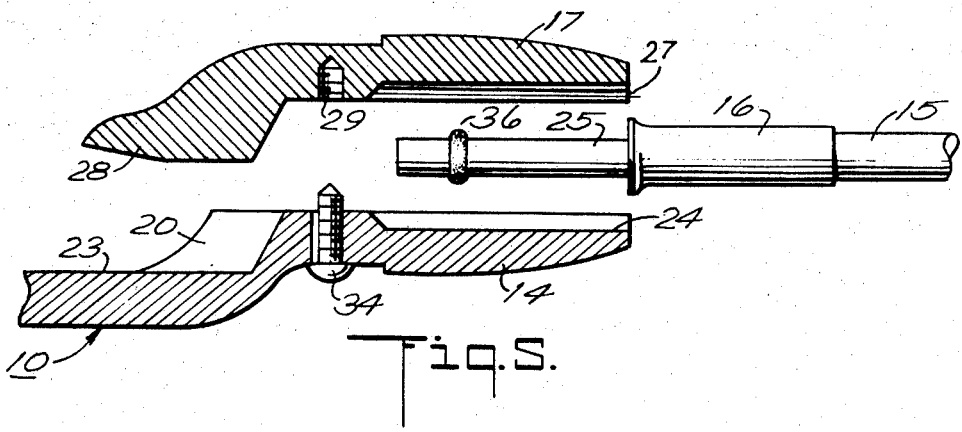
FIG. 5 illustrates a fragmentary view of a modified manner of retaining a fishing rod within a clamp and handle of the invention.

Referring to FIG. 1, fishing rod handle 10 of the casting rod type has a hand grip 11 which is slightly offset from the longitudinal axis of the forward portion of the handle, a recessed portion 12 receiving a fishing reel 13, and a forward portion 14 which is integral with the recessed portion 12 and which receives a fishing rod 15 secured within a ferrule 16 and a one piece clamp 17.

Referring to FIGS. 2 and 4, the recessed portion 12 of the handle 10 is suitably attached to the hand grip 11, which, for example, is made with a cork exterior and is provided with a depending finger grip 18 and an opening 19 above finger grip 18. In addition, the recessed portion 12 has a pair of upwardly extending retaining walls 20 to contain the sides of base plate 21 of reel 13, and a projecting ledge 22 above the rear of the base 23 to contain the rear end of the base plate 21 therebetween. The forward portion 14 of the handle has a longitudinal groove 24 of generally semi-circular shape which is sized to receive the stem 25 of ferrule 16 containing fishing rod 15. Also, forward portion 14 has a smooth walled aperture 26 formed therein between the end of groove 24 and the recessed portion 12 of the handle. One piece clamp 17 has a groove 27 in its main body portion which is substantially complementary to groove 24 in handle 10, and which fits over the stem 25 of ferrule 16. In addition, clamp 17 has a depending flange 28 which is sized to fit between the walls 20 of the recessed portion 12 of the handle in overlying relation to the forward end of the base plate 21 of fishing reel 13. Further, clamp 17 has a threaded bore 29 in substantial alignment with the aperture 26 in handle 10.

Referring to FIGS. 3 and 4, the forward portion 14 of handle 10 and the main body portion of clamp 17 have mating surfaces which include a pair of upstanding tongues 30 and a pair of adjacent notches 31 on the forward portion 14 of the handle, and a pair of complementary notches 32 and tongues 33 on clamp 17. These mating surfaces facilitate alignment of clamp 17 on the forward portion of the handle during assembly.

Referring to FIGS. 2 and 4, in order to secure clamp 17 to handle 10, a single threaded fastener, such as a screw 34, is passed through aperture 26 in the forward portion 14 of the handle and is threaded into bore 29 in clamp 17. Screw 34 is provided with a threaded shank 35 of slightly less diameter than aperture 26 to permit a slight amount of play and pivoting for adjustment to the rod diameter and base plate dimensions. Upon threading of screw 34 into clamp 17, clamp 17 is brought toward handle 10 to clamp rod 15 and reel 13 therebetween with one clamping movement. Although as shown in FIG. 2 the head of screw 34 extends on the outside of the handle, the screw may in the alternative be countersunk within a recess (not shown) in the handle so that the top of the head is substantially flush with the surface of the handle. Also, the head of the screw may in another embodiment have a threaded side periphery or wing flanges to facilitate manual tightening and loosening.

Referring to FIG. 3, in order to assemble rod 15 and reel 13 on handle 10, base plate 21 is initially positioned on the base 23 of the recessed portion 12 of the handle and slid under ledge 22. Next, stem 25 of ferrule 16 containing rod 15 is laid in the groove 24 of the forward portion 14 of the handle 10. Then, clamp 17 is placed over the handle with flange 28 contacting the forward end of base plate 21 and with groove 27 enclosing stem 25 of ferrule 16. Thereafter, screw 34 is passed through aperture 26 and threaded into bore 29 to advance clamp 17 toward handle 10. During threading of screw 34, clamp 17 adjusts to the relative dimensions of base plate 21 and stem 25 to compensate for variations in dimensions of either member, and both reel base plate 21 and stem 25 are simultaneously clamped in place between handle 10 and clamp 17 upon tightening of screw 34.

Alternatively, reel 13 can be positioned in recessed portion 12, as above, and clamp 17 then placed over base plate 21 with screw 34 being threaded a slight distance into bore 29 in order to maintain reel 13 loosely in place. Thereafter, the ferrule 16 of rod 15 is inserted between clamp 17 and the forward portion 14 of the handle and screw 34 is further tightened to clamp reel 13 and rod 15 in place.

Referring to FIG. 5, in order to further insure the retention of the fishing rod between the clamp and handle during use, a resilient O-ring 36 may be placed on the stem 25 of the ferrule 16. The O-ring 36 is of a resilient material such as rubber and is compressed between the confronting walls of clamp 17 and the forward portion 14 of the handle by the tightening of screw 34.

Figure 6:
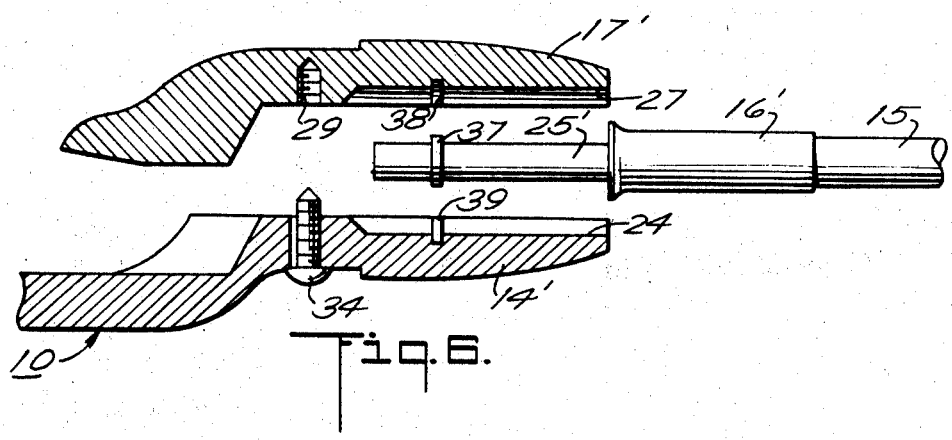
FIG. 6 illustrates another modification of a manner of retaining a fishing rod within a clamp and handle of the invention.

Referring to FIG. 6, instead of using an O-ring as above, an integral annular flange 37 may be formed on stem 25' of ferrule 16' so as to fit within complementary recesses 38, 39 in calmp 17' and the forward portion 14' of the handle. When seated in recesses 38, 39 the annular flange 37 prevents rod 15 from being pulled from between the clamp 17' and forward portion 14'.

Figure 7:
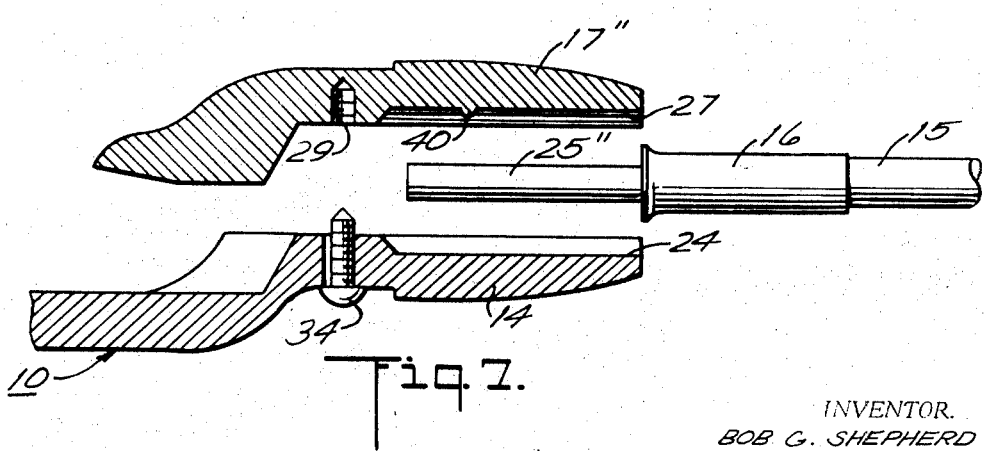
FIG. 7 illustrates still another modification of a manner of retaining a fishing rod within a clamp and handle of the invention.

Referring finally to FIG. 7, a bead 40 may be formed in clamp 17" facing the forward portion 14 of handle 10 to abut the stem 25" of the ferrule 16 on rod 15 during tightening of clamp 17" and handle 10 together so as to cause an increase in the clamping forces on the rod 15 while directing the clamping force through a single point. Alternatively, the stem of the ferrule may be provided with a recess to receive the bead on the clamp so as to insure the retention of the fishing rod between the clamp and the handle during use as well as to maintain the usual guides on the fishing rod in rotational alignment with the handle. Further, the bead may be formed on the rod ferrule to seat within a recess in the clamp or handle.

The invention provides a clamp which permits rapid clamping of a fishing reel and rod to a handle through manipulation of a single fastener by a single clamping movement. The clamp further permits securement of a number of reels having different sized base plates with a number of rods of different sized diameters.

It is noted that while the clamp has been described with respect to handles in which the handgrip is slightly offset from the longitudinal axis of the forward portion of the handle, the clamp can also be adapted for use with handles in which the longitudinal axes of the hand grip and forward portion of the handle are aligned rather than offset.

The clamp and the recessed portion of the handle may be formed, for example, of a wood or a cast aluminum, or of any other suitable material.

It is also noted that while the fastener for clamping the clamp and handle together has been described above as a removable fastener, the fastener can be permanently connected to the clamp with a limited degree of threadable movement. This allows a reduction in the manipulative steps for assembling a fishing rod incorporating the invention since the reel and rod can both be positioned in place with the clamp loosely held to the handle.

What is claimed is:

1. In combination with a fishing rod handle including a recessed portion and a forward portion having an aperture therethrough; a one-piece clamp having a depending flange overlying said recessed portion for clamping a base plate of a reel therebetween, a main body portion overlying said forward portion for clamping a fishing rod therebetween and a threaded bore in said main body portion; and a threaded fastener passing through the aperture in said forward portion into threaded engagement in the threaded bore of said main body portion for clamping said clamp to said handle.

2. The combination as set forth in claim 1 wherein said main body portion has a longitudinal groove therein for receiving the fishing rod.

3. The combination as set forth in claim 2 wherein said threaded fastener is disposed between said recessed portion and the groove of said main body portion.

4. The combination as set forth in claim 1 wherein said threaded fastener is smaller in diameter than the aperture in said forward portion to permit pivoting of said threaded fastener therein.

5. The combination as set forth in claim 1 wherein said forward portion and said main body portion each have a recess therein for receiving a flange on the fishing rod.

6. The combination as set forth in claim 1 which further comprises a resilient O-ring disposed between said forward portion and said main body portion for enveloping a fishing rod disposed between said handle and said clamp.

7. The combination as set forth in claim 1 wherein said clamp has a bead thereon facing said forward portion of said handle to abut the fishing rod disposed therebetween.

8. In combination with a fishing rod handle having a first portion for receiving a base plate of a reel therein, and a second portion for receiving a fishing rod thereon; a clamp overlying said second portion to clamp a rod therebetween, said clamp having a flange overlying said first portion to clamp a base plate therebetween, and means adjustably securing said clamp to said handle, said means being disposed intermediately of said first and second portions.

9. A combination as set forth in claim 8 wherein said means comprises a threaded fastener passing freely through said handle into threaded engagement with said clamp.

10. A combination as set forth in claim 8 wherein said second portion and said clamp have complementary grooves therein for receiving and clamping a rod therein.

11. In combination, a fishing rod handle including a recessed portion having a ledge therein for overlying one end of a base plate of a reel seated on said recessed portion, and a forward portion having an aperture therethrough and a longitudinal groove for receiving a rod therein; a clamp having a groove therein overlying the groove in said forward portion, a depending flange projecting into said recessed portion to overlie an opposite end of the base plate, and a threaded bore between said second mentioned groove and said flange; and a threaded fastener having a shank passing freely through the aperture in said forward portion and in threaded engagement in the bore of said clamp for tightening said clamp toward said handle to simultaneously clamp a base plate and a rod therebetween.

12. In combination with a fishing rod handle including a recessed portion and a forward portion having an aperture therethrough; a clamp having a depending flange overlying said recessed portion for clamping a base plate of reel therebetween, a main body portion overlying said forward portion for clamping a fishing rod therebetween and a threaded bore in said main body portion, said main body portion having a longitudinal groove therein for receiving the fishing rod; and a threaded fastener disposed between said recessed portion and the groove of said main body portion passing through the aperture in said forward portion into threaded engagement in the threaded bore of said main body portion for clamping said clamp to said handle.

References Cited

UNITED STATES PATENTS

| | | |
|---|---|---|
| 1,843,714 | 2/1932 | Fuller. |
| 2,018,923 | 10/1935 | Potter _____ 43—2 |
| 2,583,909 | 1/1952 | Warth _____ 43—2 |
| 3,364,612 | 1/1968 | Holahan _____ 43—2 |

SAMUEL KOREN, *Primary Examiner.*

JAMES H. CZERWONKY, *Assistant Examiner.*

U.S. Cl. X.R.

43—23